UNITED STATES PATENT OFFICE.

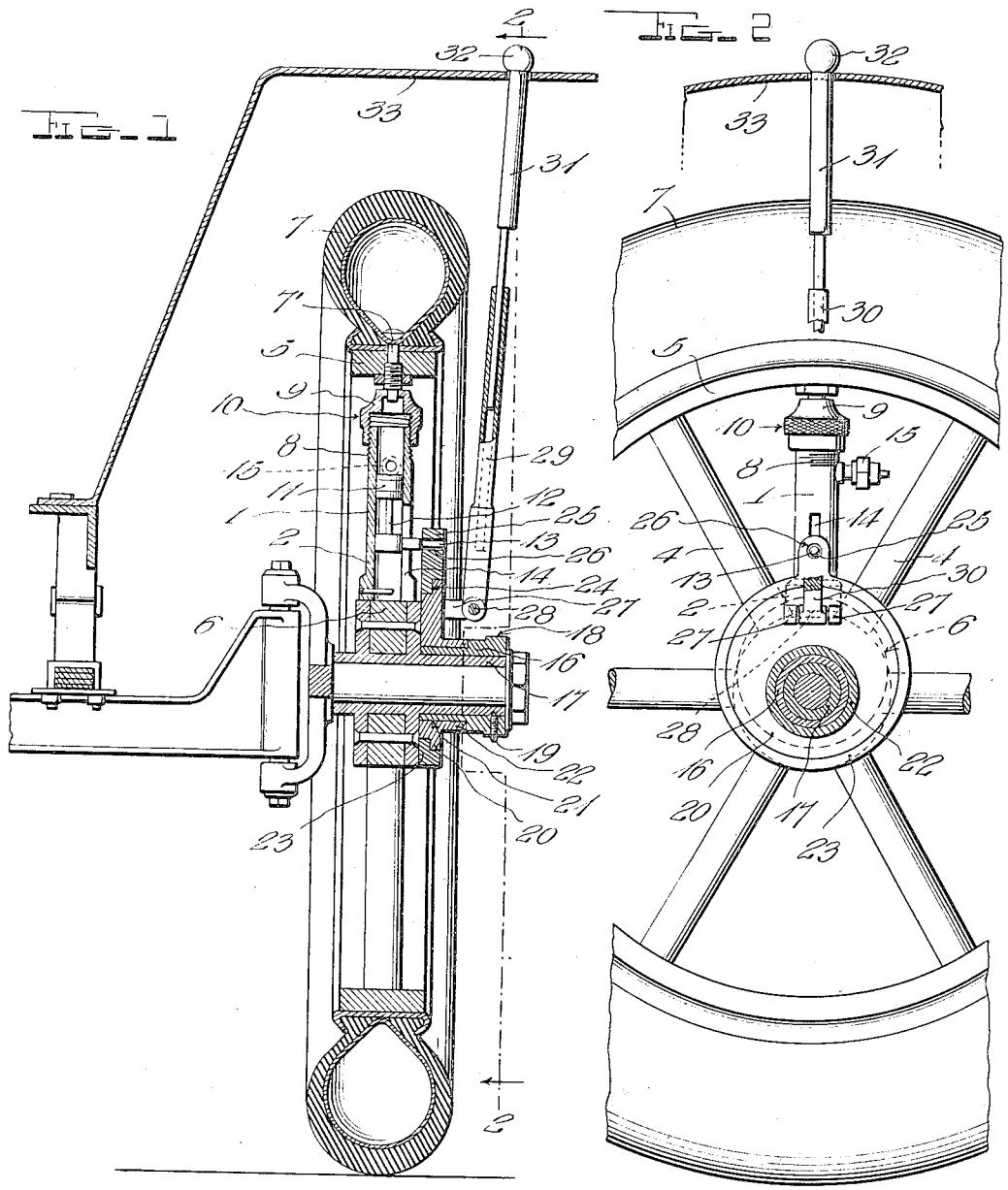

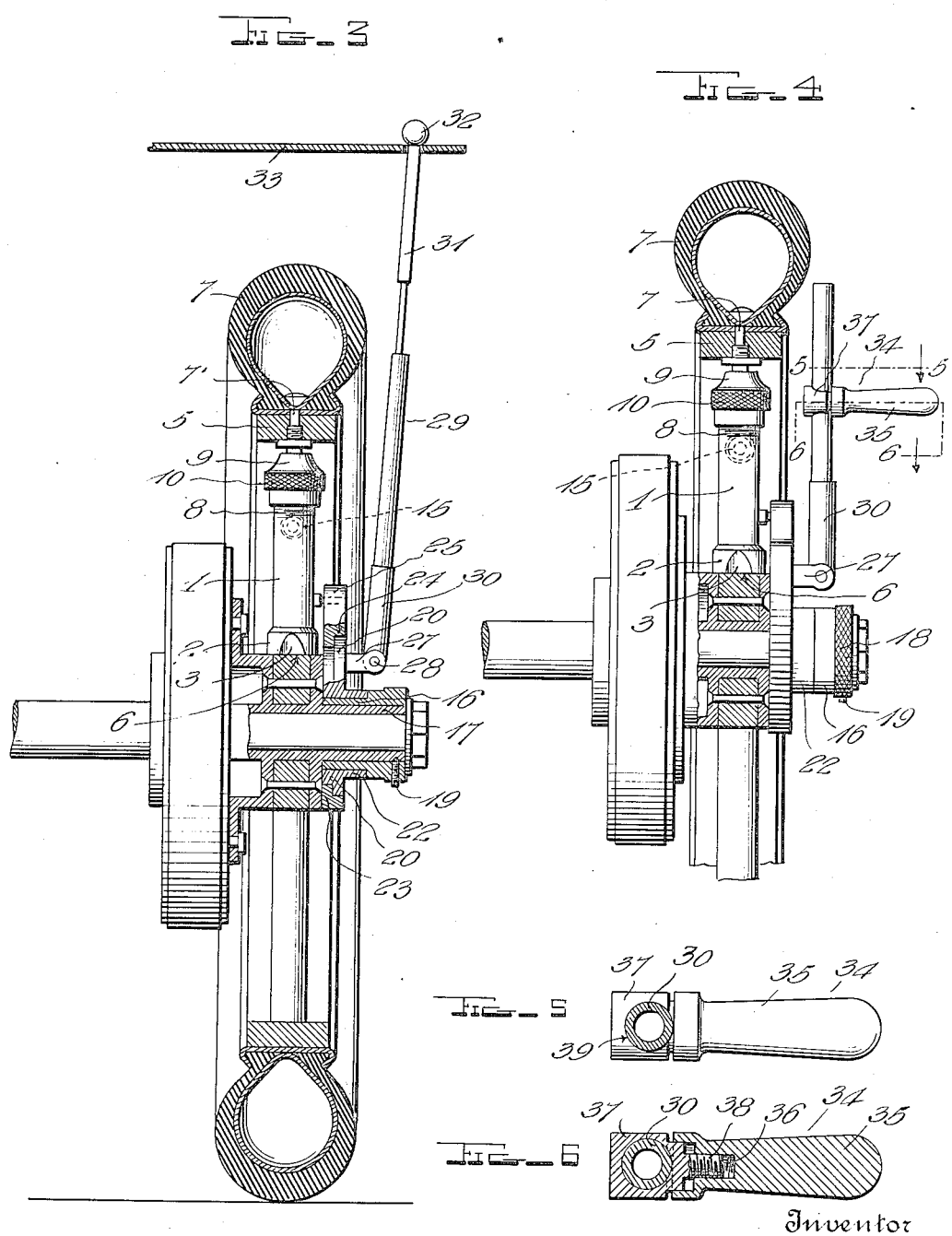

GEORGE KEITH, OF SHERIDAN, ILLINOIS.

INFLATING DEVICE.

1,225,137.  Specification of Letters Patent.  Patented May 8, 1917.

Application filed August 3, 1916. Serial No. 112,979.

*To all whom it may concern:*

Be it known that I, GEORGE KEITH, a citizen of the United States, residing at Sheridan, in the county of La Salle and State of Illinois, have invented certain new and useful Improvements in Inflating Devices; and I do declare the following to be a full, clear, and exact description of the invention, such as will enable others skilled in the art to which it appertains to make and use the same.

This invention relates to new and useful improvements in inflating devices, and the primary object of the invention is to provide an inflating device which is adapted to be attached to vehicle wheels which employ pneumatic tires and which device will automatically inflate the tire during the operation of the vehicle.

Another object of the invention is to provide a device of this character, which is adapted to have the automatic inflating means disconnected, so that the tire may be inflated by hand, without detaching the device from the wheel.

A further object of the invention is to provide a device of this character which is simple and durable in construction, inexpensive to manufacture, and one which will be very efficient in operation.

With these and other objects in view, the invention consists of the novel features of construction, and the combination and arrangement of parts which will be hereinafter more fully described and claimed.

In the accompanying drawings:

Figure 1 is a central vertical section taken through the front wheel of an automobile showing my inflating device applied thereto;

Fig. 2 is a section taken on the line 2—2 of Fig. 1, showing the wheel and part of the device in elevation;

Fig. 3 is a similar view as Fig. 1 only showing the device applied to the rear wheel of an automobile, and the pump and a portion of the eccentric in elevation;

Fig. 4 is a detail view similar to Fig. 3 showing the manner of connecting the device so that the pump may be operated manually;

Fig. 5 is a transverse section taken on the line 5—5 of Fig. 4; and,

Fig. 6 is a transverse section taken on the line 6—6 of Fig. 4.

In describing my invention I shall refer to the drawings in which similar reference characters designate corresponding parts throughout the several views and in which Figs. 1 and 2 show my device applied to the front wheel of a vehicle while Figs. 3 and 4 show the same applied to the rear wheel. Owing to the various novel details employed in the construction of this device, the same is applicable to the front or rear wheels as illustrated.

The inflating device comprises a pump cylinder 1 which is provided with a base 2 having in its opposite sides recesses 3 which are adapted to engage the adjacent spokes 4 of a wheel 5 to which this device is shown applied. The wheel 5 is provided with an inner hub portion 6 against which the inner end of the base 2 of the cylinder 1 rests. This wheel 5 is provided with the conventional type of tire 7, provided with an air valve 7' that is disposed between the spokes between which the pump is placed.

When the pump 1 has its inner end or base positioned against the hub 6 and the recessed portions engaging the spokes 4, the cylinder will project radially therefrom and its outer end will be disposed adjacent the air valve 7' through the rim of the wheel. The outer end of the pump 1 which is designated by the numeral 8 is externally threaded and the same is adapted to receive thereon one end of a cap member 9 which is internally threaded so that it may be operatively engaged therewith. The outer surface of the cap 9 is milled as shown at 10 so that the cap may be easily placed upon the outer end 8 of the pump, and adjusted longitudinally along said outer end. The outer end of the cap member is open and the same is adapted to be positioned over the air valve 7' in the rim of the wheel. By this means, the pump will be securely held between the spokes 4 and when desired may be simply removed therefrom by moving the cap member 9 along the pump until its outer end is disengaged from the valve 7'. This member also forms a connection between the outlet of the pump and the valve whereby air will be forced into the tire.

The pump 1 is provided with the usual type of piston 11 which has a stem 12 that has a bent portion 13 extending laterally through an elongated slot 14 in the side of the pump. This slot 14 extends longitudinally of the pump cylinder, so that the piston rod will be guided thereby when the rod is reciprocated to operate the pump.

The pump 1 is provided as clearly shown in Fig. 2 of the drawings, with a safety valve 15 which is of the conventional type and which is adapted when the pressure with the tire reaches a certain predetermined point, to open, to relieve the pump. The pressure gage employed by this valve is of the conventional type and the same is varied according to the difference in size and types of tires to which the pump is applied.

The pump actuating means employed in this device comprises primarily an eccentric that is surrounded by a band adapted to be reciprocated thereby, said band being connected with the projecting portion 13 of the piston rod so that it will operate the pump upon its reciprocation. The pump actuating means are removably secured into engagement with the wheel by means of a sleeve 16 which is adapted to engage the hub cap 17 of the wheel, said sleeve 16 having its outer end enlarged and milled, as shown at 18, so that the same may be easily placed in position. The sleeve 16 is frictionally held into engagement with the hub cap 17 but an additional securing means is provided which consists of a set screw 19 that extends through the sleeve when against the hub cap.

Mounted upon the sleeve 16 is the eccentric 20 employed in this device which has an opening 21 therein provided with a collar 22 that surrounds the sleeve 16. This eccentric 20 is surrounded by a band 23 which has a recessed inner edge 24 in which the outer edge of the eccentric is disposed. The band 23 is provided with a projecting portion 25 having an aperture 26 adjacent its outer edge, and when these members are in position as above described, the aperture 26 is adapted to be disposed over the projecting portion 13 of the piston rod of the pump.

When the sleeve, eccentric, and band are all mounted in position upon the hub cap 17, it will be obvious that upon rotation of the wheel 5, when the eccentric is held stationary, the band 23 will be consequently reciprocated, hence the motion will be transmitted to the piston of the pump to operate said pump whereby the tire of the wheel will be inflated automatically. When it is desired to hold the wheel stationary but to inflate the tire manually, the eccentric is rotated by means to be hereinafter more fully described, whereupon the band will be reciprocated and the above described operation will take place.

The outer surface of the eccentric 20 is provided with a pair of projecting lugs 27 between which is mounted a pivot 28. Secured at one end to the pivot 28 is one section of an anchoring rod 29 which is designated by the numeral 30, the other end of said section being hollow. The other section of this anchoring rod which is designated by the numeral 31 has an enlarged head 32 on its outer end and the section is adapted to project downwardly through an opening in the guard 33 of the vehicle, its lower end telescopically engaging the upper end of the section 30. The enlarged head 32 of the upper section 31 will prevent the same from dropping through the opening and will hold it securely into engagement with the guard 33. This section, however, may be readily removed by lifting the same through the opening in the guard where upon the connection between the guard and the eccentric will be broken, and the eccentric will be free. While the parts of this anchoring rod are in position, the eccentric 20 will be securely held and will be prevented from rotating. This is necessary when the inflating device is operated automatically by the rotation of the wheel. Owing to the fact that the anchoring rod is formed in two sections, and the said sections are telescopically engaged with each other, a limited movement will be allowed between the same, which is essential when this device is used on one of the front wheels of the vehicle. It will be obvious that by this construction, the wheel may turn without breaking the connection or releasing the eccentric.

When it is desired to operate the inflating device manually, the upper section 31 of the anchoring rod is removed, and the lower section 30 is swung outwardly so that it may be easily engaged with a handle 34. This handle 34 comprises a gripping portion 35 which has one open end internally threaded as shown at 36, and the said open end is adapted to receive a holding portion 37 having a reduced threaded end 38 for operative engagement within the open end 36 of the hand gripping portion. The portion 37 has a large opening 39 extending therethrough which extends slightly below and into the reduced end of the same so that upon these two parts being brought together, any member disposed through the opening 39 will be securely gripped and held thereby. The end of the lower section 30 of the anchoring rod is adapted to be passed through the opening 39 in the holding section and to be securely gripped by the handle as has been hereinbefore described. This handle may be positioned on the lower section 30 at any desired point where it is easiest to rotate said section. The rotation of this section when the wheel is stationary, will consequently operate the eccentric 20 and inflate the tire in a manner hereinbefore described.

From the foregoing description of the construction and operation of this inflating device, it will be obvious that the same may be easily attached to or detached from a vehicle wheel, and when secured thereon, the pump may be either operated automatically or manually. When the device is operated automatically, the anchoring rod 29 owing to the fact that the same is connected with the guard of the wheel, will hold the eccentric 20 stationary, so that upon rotation of the wheel, the band that surrounds the eccentric will be moved around the same, and as it is connected with the pump that is fixed to the wheel it will be reciprocated and the pump will be operated. The projecting portion of the band is connected with the laterally projecting portion of the piston of the pump so that upon each rotation of the wheel, the piston in the pump will be reciprocated and air will be forced into the tire. The pump cylinder is provided with a safety valve that comes into operation when the desired pressure has been reached. During the operation of the pump the tire valve 7' opens to admit air to the tire, but, it ceases to operate as soon as the pressure of the air in the pump is sufficient to operate the safety valve.

When it is desired to operate this inflating device manually, the upper section of the anchoring rod 29 is removed, and the handle 34 is attached to the lower section of the rod so that on rotation of this section, the eccentric will be moved and the pump operated. The band surrounding the eccentric will be reciprocated as has been hereinbefore described upon the movement of this eccentric, and owing to the above described connection between this band and the pump, the inflating operation will take place.

This inflating attachment or device is easily applied to various types of vehicle wheels owing to the novel details of construction employed by the same, namely the telescoping engagement between the two sections of the anchoring rod. The device is adapted to operate automatically when applied to the front or the rear wheels of the vehicle. The eccentric and band may be easily attached to and detached from the wheel by the sleeve 16 upon which they are mounted and being easily secured to or removed from the hub cap. Upon the removal of these parts, the movement of the pump cylinder 1 to detach member 9 along the pump cylinder 1 to detach the same from the air valve 7' will free the outer end of the pump whereupon the same may be easily detached from between the spokes of the wheel. The inner end of the pump is held into engagement with the hub by means of the recesses 3 in the base, which engage the inner sides of the adjacent spokes.

I claim:

1. An inflating device comprising a pump having one end positioned against the hub of a wheel and projecting radially therefrom, said end having recessed opposite sides adapted to engage the adjacent spokes of the wheel, screw threads on the opposite end of said pump, an internally threaded cap member operatively engaging said end and adapted to connect the outlet of the pump with the air valve of said wheel to secure said pump in position, and pump actuating means carried by said wheel.

2. An inflating device comprising a pump adapted to be detachably connected to a vehicle wheel to inflate the tire thereof, an eccentric adapted to be mounted on the hub of said wheel, means to operatively connect said eccentric and pump, and an anchoring rod comprising two sections, one of said sections hinged to the eccentric and extending to a point in the direction of the guard of said wheel, and the other section extending downwardly through said guard, an enlarged head on the upper end positioned above said guard and the lower end of said section slidably engaging the adjacent end of the first mentioned section.

In testimony whereof I have hereunto set my hand in the presence of two subscribing witnesses.

GEORGE KEITH.

Witnesses:
LILLIAN E. HATHORN,
J. A. POTTER.